Patented May 9, 1939

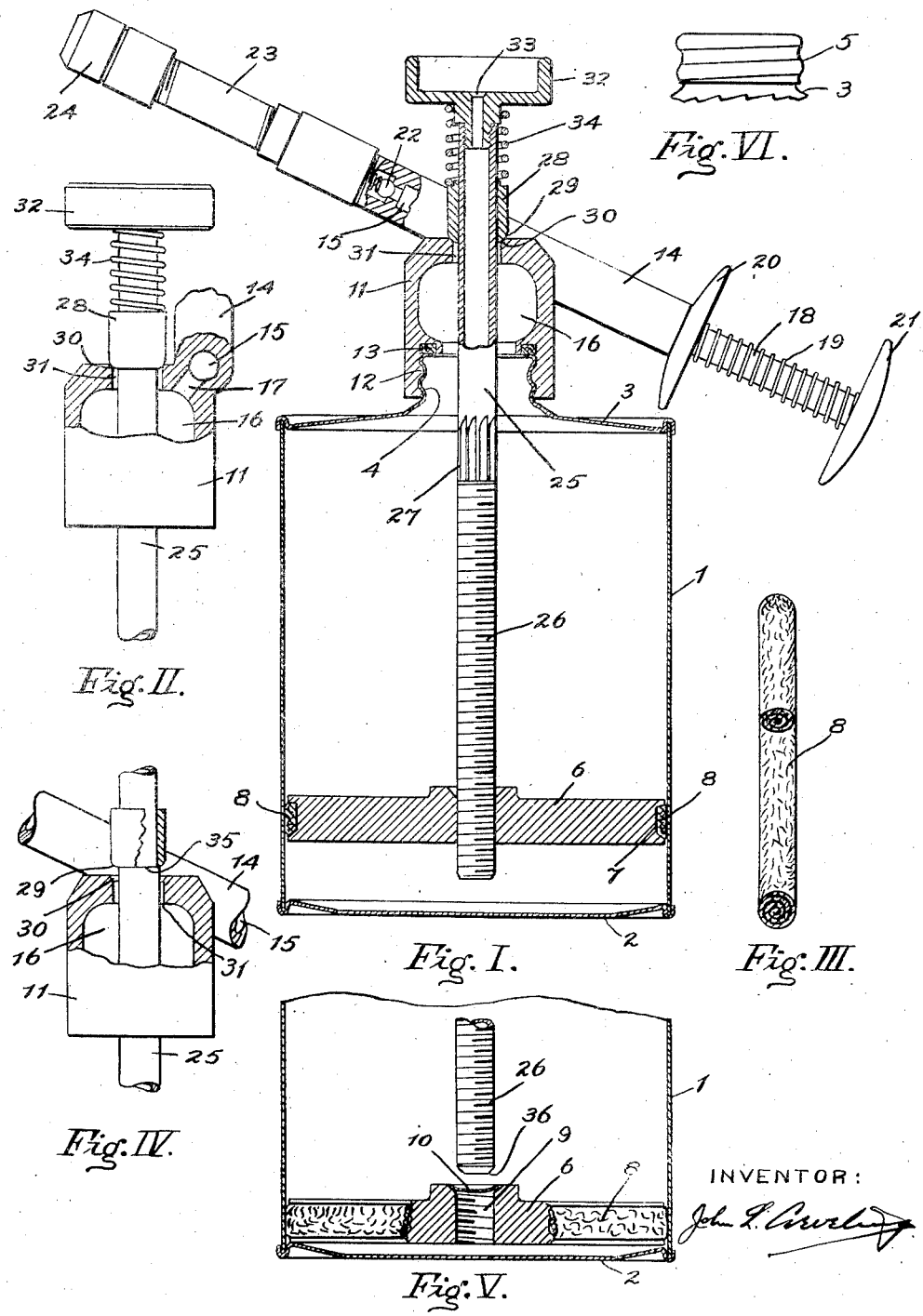

2,157,402

UNITED STATES PATENT OFFICE 2,157,402

LUBRICATING MEANS

John L. Creveling, near Tucson, Ariz.

Application October 15, 1937, Serial No. 169,223

20 Claims. (Cl. 221—47.3)

This invention pertains to that class of lubricating means primarily employed for forcing a lubricant, such as oil or grease, into lubricating fittings connected with parts to be lubricated, and has for an object to provide simple, inexpensive an deffective means whereby this may be accomplished and whereby a very high pressure may be exerted upon the lubricant when necessary. A further object of my invention is to provide such a means which may be supplied with lubricant directly from an "original package", such as a can or cartridge, in which lubricant may be packed, stored, transported and sold.

Other objects will be obvious in view of the following specification.

Fig. I is a partial section and partial elevation of one form of lubricating means embodying my invention.

Fig. II is a partial section and partial elevation of a portion of the structure of Fig. I, the section being taken in a plane substantially 90 degrees from that of Fig. I.

Fig. III is a partial elevation and partial section of one type of packing ring which may be employed in the structure of Fig. I.

Fig. IV is a partial elevation and partial section of a portion of the structure of Fig. I, the main section being taken in the same plane as in Fig. I.

Fig. V is a partial elevation and partial section of a portion of the structure of Fig. I, showing different positions of some of the parts.

Fig. VI is an elevation of a cap such as may be used to close the container of Fig. I when the container is not in use in combination with the other parts.

In so far as common subject-matter is disclosed, this is a continuation of my pending application for improvement in Lubricating means, Serial No. 680,892, filed July 17, 1933.

In the drawing, which is substantially a full size portrayal of one form of my invention which I have found particularly useful, I indicates the side wall of a well-known type of tin can provided with a fixed fluid-tight bottom 2 and a fixed top 3, having a threaded neck 4 which may be closed as by means of a threaded cap such as shown at 5 in Fig. VI.

Before the top 3 is placed upon the can, a piston 6 is placed therein so as to rest upon the bottom 2, as shown in Fig. V. Then, after the top 3 is properly seamed upon the can, it may be filled with lubricant to a proper height so as to leave a suitable air space at the top to allow for expansion, as is customary. The can may then be closed by means of a cap, as shown in Fig. VI, and stored, transported and sold in the usual manner such original containers are handled.

A very satisfactory form of piston 6 for the purpose may be made of wood provided with a peripherial groove of the shape indicated at 7 in Fig. I, which is filled with a resilient packing, as indicated at 8 in Figs. I and V, a type of such packing which I have found very satisfactory being formed of a short length of seamless tubular knit or woven material, such as used in the manufacture of stockings, rolled upon itself so as to form a ring of circular section, as indicated in Fig. III. Such a ring is quite elastic and can be readily stretched over the piston where it will be held tightly in the groove 7, and if of proper dimensions will form a very satisfactory fluid-tight joint or contact with the side wall I of the container. The piston is provided wtih a screw-threaded opening 9 which is normally closed by a paper washer or disc, preferably glued thereto, and indicated at 10 in Fig. V.

The bonnet 11 of Figs. I, II and IV, is provided with an internal thread 12, adapted to be screwed upon the neck 4 in place of cap 5 and make a fluid-tight joint therewith by means of the gasket 13 of cork or other suitable resilient material. The bonnet 11 carries a pump barrel 14, having a bore 15 which communicates with the chamber 16 of the bonnet 11, as by means of the port 17 shown in Fig. II.

The bore 15 is provided with a fluid-tight plunger (not shown) which is attached to the rod 18 and is normally held in a position to uncover the port 17 by the spring 19 between the mushroom discs 20 and 21. The outlet end of the bore 15 is provided with an outwardly opening check valve 22 permitting lubricant to pass from the bore 15 into the tubular member 23 which communicates with the nozzle 24, adapted to form a fluid-tight contact with suitable fittings, in a now well-known manner.

The tubular stem 25 is provided with a threaded portion 26, adapted to fit snugly in the threaded bore 9 of piston 6, and also with a fluted portion 27 which is similar to an ordinary reamer. The upper portion of the stem 25 is provided with a close fitting, slidable, sleeve 28 which is rounded at its lower end, as shown at 29, and adapted to form a fluid-tight joint with the seat 30 in the bonnet 11. The seat 30 surrounds the opening 31 in the bonnet 11, which opening is appreciably larger in diameter than the stem 25. The upper end of the stem 25 is provided with a small hand wheel 32 which is formed with a central opening 33 communicating with the bore of the stem 25, and a compression spring 34 is placed around the stem 25 between the wheel 32 and the sleeve 28, as shown in Figs. I and II.

With the parts in the positions shown in Fig. I, it will be plain that, if the space in the can 1 above the piston 6 and the chamber 16 be full of lubricant and the wheel 32 be rotated so as to screw the threaded portion 26 of stem 25 into the threaded portion of piston 6, the spring 34 will be compressed and tend to raise the piston and thus put the lubricant in the can and chamber 16 under pressure which will tend to cause it to flow through port 17 into the bore 15 of the pump barrel 14, since the tubular stem 25 passes through the piston 6 and communicates with the atmosphere at 33.

Therefore, if the plunger in the bore 15 be now moved forward, as by grasping the discs 20 and 21 and causing 21 to be moved toward 20, it will force the air from the bore 15 beyond the check valve 22 and through 23 to the nozzle where it will be expelled. If spring 19 be now allowed to return 21 to the position shown in Fig. I, the retraction of the plunger will cause a partial vacuum in the bore 15 until it passes the port 17, whereupon the lubricant will tend to rush into the bore 15 and fill the same, being urged to do so by the effect of the above-mentioned pressure thereupon due to spring 34. Then, if the nozzle be placed in operative contact with a proper fitting, lubricant may be forced thereinto, under heavy pressure if necessary, by reciprocation of the plunger by means of manually movable disc 21 which may be pushed toward the fitting in a well known manner. As lubricant is used from the can, an occasional turn of the wheel 32 will keep the spring 34 compressed and maintain the pressure upon the lubricant to continue to feed the pump, in an obvious manner, until the entire supply is practically exhausted and the reamer 27 has cut the thread out of the piston 6 and enlarged the bore therein until the stem 25 may be withdrawn from the piston and bonnet 11. Then the bonnet 11 may be unscrewed from the can and the can discarded, as it has been rendered useless for refilling and using by cutting out the thread in the piston.

Withdrawing the stem 25 will cause some of the lubricant in the chamber 16 to be removed with the stem, particularly if a relative stiff, stringy, grease be employed, and a few strokes of the plunger in bore 15 will cause some more to be withdrawn from the chamber 16 so as to leave the same fairly empty, or at least with a large central passage therethrough. The bonnet may now be screwed upon a fresh can of lubricant, in an obvious manner.

The stem 25 should now have the reamer portion 27 cleaned of any cuttings taken from the piston and it will then be ready to insert into the fresh can, though I usually prefer to clean the entire stem before so doing as it makes the insertion of the stem a cleaner operation.

In practice, I prefer to make the stem below that part traveled by the sleeve 28 slightly larger than the bore of the sleeve, as shown at 35 in Fig. IV, so that when the stem is removed the sleeve 28 and spring 34 will remain in their operative positions upon the stem. If the stem now be inserted in the fresh can of lubricant with the bonnet attached thereto, as shown in Fig. I, the edge 36 of the stem 25, as shown in Fig. V, may be caused to perforate the paper disc 10 and the thread 26 will engage the thread 9 in the piston 6, and then turning the wheel 32 will cause the thread 26 to enter the piston and move downwardly, in an obvious manner.

The wheel 32 is thus turned until the sleeve 28 is about ready to strike its seat, as shown in Fig. IV, or until it just strikes the seat and has very little, if any, spring pressure thereupon; and then an upward pull upon the stem 25, as by pulling upon the wheel 32, will raise the piston 6 and expel any air that may be in the chamber 16 and upper portion of the can through the opening 31 and around the stem, as may be seen most plainly in Fig. IV.

When the air has been expelled and lubricant appears around the stem 25 at 31, further turning of the wheel 32 will cause the stem to descend; and when the sleeve 28 contacts with its seat 30, further turning of the wheel 32 will cause the lubricant above the piston 6 in the can to be placed under spring pressure and urged to feed the bore 15 when its piston is reciprocated, as above outlined.

And it will be obvious that inasmuch as the area of piston 6 is very many times the area of the portion of sleeve 28 exposed to lubricant pressure, a lubricant-tight joint will be maintained between the rounded portion 29 of sleeve 28 and its seat 30, and that this will be true even if the axis of the stem be not exactly normal to the plane of the seat 30, since the rounded portion 29 presents a substantially spherical surface against the seat 30.

It will be plain that, as the stem 25 is pressed into a fresh can of lubricant, some of the lubricant will tend to enter the bore of the stem. This tendency may be lessened by placing a finger over the opening 33 while inserting the stem but, even without observing this precaution, any lubricant that enters the stem during this operation is expelled from the bore of the stem when the piston 6 is lifted to expel the air from the top of the can, as above described, as raising piston 6 creates a partial vacuum below the piston unless the bore of the stem 25 is free to admit air to the space between piston 6 and the bottom of the can. Further, the wheel 32 is made of such shape as to resemble the mouthpiece of a wind instrument so that one may readily blow through the stem to assist in clearing any obstruction therein and to assist the spring 34 in overcoming any dents in the can, if desired, though this is seldom if ever necessary in practice.

From the foregoing it will be noted that I have produced a simple and handy lubricating means which employs a container having permanently fixed end closures from which a lubricant of any reasonable density and viscosity may be withdrawn and injected into bearings to be lubricated. And it will be plain that when the same is not in use the pressure upon the lubricant in the container may be relieved by turning the wheel 32 in the proper direction, and the tendency for lubricant to leak past the piston 6 thus reduced to a minimum, which I have found to be negligible.

Further, if any lubricant should leak past the piston it will not issue from the can and cause any damage to objects with which it may be in contact.

Also, it will be noted that the entire structure is one that can be produced cheaply and employs a very cheap type of piston in the container, which container does not have to be further modified than to have the piston placed therein, as the piston shown will prevent any appreciable leakage along the longitudinal seam of an ordinary can, such as now used by major oil companies for holding lubricant.

By properly shaping the head 3 of the can and the upper surface of the piston 6, substantially the entire contents of the can may be used, as the piston 6 "strips" the can very thoroughly; and any contamination of the lubricant is entirely avoided by using the lubricant directly from the orginal can. And it need not even be exposed to the atmosphere, save as the cap 5 is removed and the bonnet 11 placed upon the can in its stead, and even then only a small opening is presented to the air.

While I have shown only one form of my invention for illustration of a preferred embodiment thereof and only one type of piston to be placed in the cans, I have used a great number of kinds of pistons, made of various materials in various shapes, as well as various kinds of packing materials for the pistons of the type shown herein, such as cotton wicking, jute cord, jute packing, marline, etc., and have found many to be satisfactory in maintaining a practically fluid-tight contact with the side of the can. The piston chosen for illustration is taken merely because it works very satisfactorily and is readily assembled and can be made cheaply and with great uniformity, and is readily handled before and during the process of placing in the can.

I do not wish to be in any way limited to the exact constructions or materials here portrayed to disclose one form of my invention, as it will be obvious that wide departure may be made therein without departing from the spirit and scope of my invention which is as set forth in the following claims.

I claim:

1. Lubricating means including a container having end closures, a follower positioned near one of said closures, a removable member associated with another end closure and communicating with the interior of the container, a pump associated with said member in operative communication with the interior of said container, a tubular element passing through said member and engaging the follower and adapted to exert pressure upon the same and to admit air between the follower and the first-named one end closure.

2. Lubricating means including a container having end closures, a follower positioned near one of said closures, a removable member associated with another end closure and communicating with the interior of the container, a pump associated with said member in operative communication with the interior of said container, a tubular element passing through said member in fluid-tight relationship thereto and engaging the follower and adapted to exert pressure upon the same and to admit air between the follower and the first-named one end closure.

3. Lubricating means including a pump portion provided with container engaging means, a container having complementary engaging means engaged thereby in operative relation to said pump, said container including a movable lubricant displacing piston, and a tubular member passing through said piston and admitting air beyond said piston and provided with means for moving the same.

4. Lubricating means including a pump portion provided with container engaging means, a container having complementary engaging means engaged thereby in operative relation to said pump, said container including a movable lubricant displacing piston, and a tubular member passing through said piston and admitting air beyond said piston and provided with means for moving the same, and also with means for rendering the said last-named means inoperative with respect to said piston.

5. A lubricant pump assembly for use with a container of the original package type having a closed bottom, an apertured top and sealed-in piston, said assembly including a pump, a member for engaging a portion of said top and operatively connecting said pump with the interior of the container, and means for engaging and moving said piston and admitting air between said piston and the bottom of said container.

6. A lubricant pump assembly for use with a container of the original package type having a closed bottom, an apertured top and sealed-in piston, said assembly including a pump, a member for engaging a portion of said top and operatively connecting said pump with the interior of the container, and means for engaging said piston and yieldingly tending to move the same and adapted to admit air between the piston and the bottom of said container.

7. A container for viscous material including a side wall portion and end portions of sheet material all permanently united in fixed relative positions, one of said end portions being permanently closed and the other end portion being provided with means adapted to form a fluid-tight joint with complementary means and align the axis of said complementary means with the central axis of the container, and a piston provided with a resilient packing ring in substantially fluid-tight contact with the side wall portion.

8. A container for viscous material including a side wall portion and end portions of sheet material all permanently united in fixed relative positions, one of said end portions being permanently closed, and a piston provided with a resilient packing ring formed of seamless tubular material rolled upon itself to form a ring of spiral cross section in substantially fluid-tight contact with the side wall portion.

9. A container for viscous material including a side wall portion and end portions of sheet material all permanently united in fixed relative positions, one of said end portions being permanently closed and another being provided with pump engaging means, and a piston provided with a resilient packing ring in substantially fluid-tight contact with the side wall portion, and a normally closed aperture therethrough in alignment with the central axis of the pump engaging means.

10. A container for viscous material comprising a side wall portion and end portions permanently attached thereto, one end portion forming a permanently fluid-tight closure, and a piston in close proximity to said end and provided with a perforation therethrough, another of said end portions being provided with an outwardly extending outlet neck, adapted to make fluid-tight connection with complementary means and align the axis thereof with the said perforation in said piston and removable means for closing the same.

11. A container for viscous material comprising a side wall portion and end portions permanently attached thereto, one end portion forming a permanently fluid-tight closure, and a piston in close proximity to said end and provided with a threaded perforation therethrough, another of said end portions being provided with an outlet neck adapted to make fluid-tight connection with complementary means and align the axis thereof with the said perforation in said piston and removable means for closing the same.

12. A container for viscous material comprising a side wall portion and end portions permanently attached thereto, one end portion forming a permanently fluid-tight closure, another being provided with a pump connection, a piston in close proximity to said one end and provided with a perforation therethrough, and frangible means closing said perforation, said pump connection including a threaded member having its central axis in alignment with the perforation in the piston.

13. Lubricating means including a pump assembly provided with a pump and means communicating therewith for forming fluid-tight communication with a container, a container in operative relation thereto and including a lubricant displacing piston, said pump assembly including a tubular member passing through said piston for admitting air beyond the piston and for moving the piston.

14. Means for applying viscous material packed in cans having displacing pistons therein, comprising a bonnet adapted to form a fluid-tight connection with a can and have communication with the interior of the can and with the atmosphere, and having associated therewith means for operatively engaging and moving the piston to displace the material into the bonnet and expel air that may be contained therein through the communication with the atmosphere, and means for closing the communication with the atmosphere.

15. Means for applying viscous material packed in cans having displacing pistons therein, comprising a bonnet adapted to form a fluid-tight connection with a can and have communication with the interior of the can and with the atmosphere, and having associated therewith means for operatively engaging and moving the piston to displace the material into the bonnet and expel air that may be contained therein through the communication with the atmosphere, means for closing the communication with the atmosphere and ejecting means receiving said material and adapted to eject the same.

16. In apparatus of the class described, a container having a fixed end closure and a piston in proximity thereto and adapted to serve as a marketable package, combined with a readily attachable-detachable pumping unit having associated therewith a member passed through the contents of said container to engage the piston and move the same to supply the pumping unit with the contents of the container.

17. In apparatus of the class described, a container having an end closure and a piston in proximity thereto and adapted to serve as a marketable package, combined with a readily attachable-detachable pumping unit having associated therewith a member passed through the contents of said container to engage the piston and move the same to supply the pumping unit with the contents of the container, said member being provided with a duct for conveying air to a point between the piston and the end closure.

18. A pump assembly for use with prefilled containers of the type having an open end and a fixedly closed end and a piston near the latter, said assembly including a portion adapted to communicate with the interior of the container at the open end, a pump element in operative relation to said portion, and an element adapted to be passed through the contents of the container to engage and move the piston.

19. A pump assembly for use with prefilled containers of the type having an open end and a closed end and a piston near the latter, said assembly including a portion adapted to communicate with the interior of the container at the open end, a pump element in operative relation to said portion, and an element adapted to be passed through the contents of the container to engage and move the piston of the container and convey air between the piston and the closed end.

20. The method of packing, merchandising and using viscous materials such as lubricants, which consists in packing the material in a container having a leak-proof bottom and a piston in proximity thereto and a removable top portion for closing the container; merchandising said material thus sealed in said container; using said material by removing the said top portion to open the container and applying thereto means providing a fluid-tight connection with the interior of the container and having associated therewith means for engaging and moving the piston to displace the material, means receiving the material thus displaced and for exerting expelling pressure thereupon and, by manipulation of the piston moving means and the pressure exerting means, forcing said material against a surface to be treated therewith.

JOHN L. CREVELING.